Patented Dec. 8, 1953

2,662,029

UNITED STATES PATENT OFFICE 2,662,029

PARAFFIN WAX HAVING LOW ELECTRICAL CONDUCTIVITY AND METHOD OF COATING GLASS THEREWITH

Kenneth N. Mathes and Thomas J. Rasmussen, Schenectady, N. Y., assignors to General Electric Company, a corporation of New York No Drawing. Application October 17, 1950,
Serial No. 190,668

2 Claims. (Cl. 106—270)

This invention relates to paraffin waxes having low electrical conductivity even under conditions of high humidity. More particularly, the invention is concerned with a composition of matter comprising a paraffin wax having incorporated therein a polyorganohalogenopolysiloxane.

Paraffin wax has been used for various applications involving coatings, and in applications using the paraffin wax as a binder. In some cases, it is highly desirable and often essential that the paraffin wax have good electrical surface resistance, especially under high humidity conditions. Such characteristic paraffins are employed in electronic precipitators as binders for glass mats. One of the chief troubles with the filter media used in the electronic precipitators results from high conductivity of the media under conditions of high humidity. Paper mat and glass mat bonded with polystyrene were found to have a resistivity in the range of 125 to 315 megohms. Paraffin-bonded glass mat has a resistivity of 3000–5000 megohms. Although desired glass mat treated with the vapors of an organohalogenosilane, for example, dimethyl dichlorosilane, has a resistivity of 200,000 megohms, such treated glass mats are unsatisfactory and unsuitable because of lack of strength. It is, therefore, essential that the glass mat be bonded with some material which has adequate resistivity and for this reason attempts have been made to use paraffin wax as the bonding agent. However, up to the present time, so far as is known, the attempts to use paraffin wax as a binder have been unsuccessful because of the poor resistivity of the combination of the paraffin and glass fiber filler.

We have now discovered unexpectedly that paraffin wax can be modified and used to give a product which has unobviously high resistivity and low conductivity of electrical current. More particularly, we have found that the incorporation of a small amount or even a large amount of a polyorganohalogenopolysiloxane, for example, from about 0.05 to 50 per cent of the polyorganohalogenopolysiloxane, based on the total weight of the wax and polysiloxane, materially improves the resistivity, especially the surface resistivity, of the paraffin wax when the latter is used as a binder for the glass mat. The use of the modified wax greatly improves the composite product and permits the bonded glass mat to be used effectively in certain applications, namely, as a filter medium in electronic precipitators.

The polyorganohalogenopolysiloxanes employed in the practice of the invention may comprise any one of those well known and more particularly disclosed and claimed in Sauer Patent 2,421,653, issued June 3, 1947, and assigned to the same assignee as the present invention. Among such polyorganohalogenopolysiloxanes which we may use are, for example, polymethylchloropolysiloxanes, polyethylchloropolysiloxanes, polymethylbromopolysiloxanes, polyphenylchloropolysiloxanes, mixed polymethyl and phenylchloropolysiloxanes in which the silicon atoms in the polysiloxanes contain either both methyl and phenyl groups or else the alternate copolymerized siloxy units in the polysiloxane comprise methylsiloxanes and phenylsiloxanes, etc. Other compounds of this class which can be employed in the practice of the invention are more particularly disclosed in the aforementioned Sauer patent which also includes various methods for preparing such materials.

The amount of polyorganohalogenopolysiloxane which may be employed with the paraffin wax may, of course, be varied within wide limits. However, we may use amounts as small as from about 0.1 to 10 per cent. It is, of course, understood that larger amounts are not precluded since measurable improvements in the surface resistivity of the paraffin wax may be realized by the incorporation of larger amounts as compared to the same paraffin wax in which the polyorganohalogenopolysiloxane is omitted. Generally we prefer to use an amount equal to from about 0.25 to about 7.5 per cent of the polyorganohalogenopolysiloxane based on a total weight of the latter and the paraffin wax.

The paraffin wax employed is any one of the well-known hydrocarbon waxes having adequate softening points, for example, softening points well above room temperature, for instance, around 60 to 80° C. Generally, the paraffin used in the practice of the invention comprises a solid paraffin wax which may or may not contain carbon-bonded chlorine.

In order that those skilled in the art may better understand how the present invention may be practiced, the following examples are given by way of illustration and not by way of limitation. All parts are by weight.

EXAMPLE 1

In this example, paraffin wax was mixed with varying amounts of a mixture of polymethylchloropolysiloxane similar to that described and claimed in the aforementioned Sauer patent. For comparison purposes, tests were conducted on the paraffin wax free of any additive and also on paraffin wax in which a small amount of diacetoxydimethylsilane was incorporated. The method for incorporating the silicon-containing materials was to melt the wax and add the individual silicon-containing compositions and mix them thoroughly to obtain a homogeneous mixture. Thereafter, each of the mixtures as well as the control sample comprising pure paraffin wax was applied to glass slides and the coated slides tested for surface resistance in megohms at 96 per cent relative humidity at 75° C. The following Table I shows the results of these tests:

Table I

| | Surface resistivity in megohms, 96% relative humidity 75° C. | | |
|---|---|---|---|
| | 1 day | 2 days | 5 days |
| 100% paraffin | 97 | | 79 |
| 99.5% paraffin+0.5% polymethylchloropolysiloxane | $18 \times 10^{12}$ | $18 \times 10^{12}$ | $8.7 \times 10^{12}$ |
| 98.0% paraffin+2.0% polymethylchloropolysiloxane | $16 \times 10^{12}$ | $15 \times 10^{12}$ | $13 \times 10^{12}$ |
| 95.0% paraffin+5.0% polymethylchloropolysiloxane | $16 \times 10^{12}$ | $18 \times 10^{12}$ | $16 \times 10^{12}$ |
| 99.5% paraffin+0.5% diacetoxydimethylsilane | | $2.5 \times 10^{12}$ | |

EXAMPLE 2

In this example, a glass mat comprising a mass of glass fibers was impregnated and bonded with paraffin wax containing 0.5% of the mixture of polymethylchloropolysiloxanes described in Example 1. The surface resistivity at 96 per cent relative humidity was measured after one day. A similar paraffin-bonded glass mat was also measured under the same conditions with the following results. The glass mat bonded with the paraffin alone showed a surface resistivity of $5 \times 10^3$ megohms while the glass mat bonded with the paraffin wax containing 0.5 per cent, by weight, based on the total weight of the paraffin wax and the polymethylchloropolysiloxane, showed a surface resistivity of $6.6 \times 10^5$ megohms.

EXAMPLE 3

In this example, glass slides were coated with paraffin wax alone and with paraffin wax containing various amounts of polymethylchloropolysiloxane, and also paraffin wax containing a mixture of methylchlorosilane comprising dimethyldichlorosilane and methyltrichlorosilane, and also paraffin wax containing dimethylsilyl diacetate. In each case, the glass slide was coated with the particular paraffin wax by melting the wax and dipping the slide therein. The following Table II shows the results of the conductance of the coatings measured in micromicrohos when the samples were conditioned one day at 96 per cent relative humidity (room temperature) and when 115 volts were passed through during the measuring tests:

Table II

| Sample | Conductance micromicromhos |
|---|---|
| Plain glass slide | 52,000 |
| Glass slide plus untreated paraffin | 10,000 |
| Glass slide plus paraffin containing 0.5% polymethylchloropolysiloxane | 0.056 |
| Glass slide plus paraffin containing 2.0% polymethylchloropolysiloxane | 0.062 |
| Glass slide plus paraffin containing 25.0% polymethylchloropolysiloxane | 0.070 |
| Glass slide plus paraffin containing 50.0% polymethylchloropolysiloxane | 0.073 |
| Glass slide plus paraffin containing 0.5% mixture methylchlorosilanes | 0.20 |
| Glass slide plus paraffin containing 0.5% dimethylsilyl diacetate | 0.37 |

Attempts to first coat the glass slide with the polymethylchloropolysiloxane and thereafter with untreated paraffin wax were unsuccessful because the wax would not bond satisfactorily nor give a continuous film. Even application of the paraffin wax and treatment of the wax-coated surface with the polymethylchloropolysiloxane gave substantially inferior surface resistivity results.

It will, of course, be apparent to those skilled in the art that other polyorganohalogenopolysiloxanes in place of the polymethylchloropolysiloxanes disclosed in the foregoing examples may be used without departing from the scope of the invention. In addition, various solid paraffin waxes including, as pointed out previously, chlorinated waxes, may also be employed.

The modified paraffin waxes embraced by the present invention may be used as described above for bonding glass mats which are to be used in electron precipitators. In addition, the paraffin waxes may also be employed for coating agents where it is desired to prevent excess electrical surface leakage especially under high humidity conditions.

In making the paraffin-bonded glass mats described above, the amount of treated paraffin which may be employed may be varied within wide limits. Thus, the paraffin may comprise, for example, from about 2 to 25 per cent of total weight of the glass mats and the paraffin wax.

What we claim as new and desire to secure by Letters Patent of the United States is:

1. A composition of matter having a low electrical conductivity under high humidity conditions and consisting essentially of a paraffin wax having incorporated therein from 0.05 to 10 per cent, by weight, of a polymethylchloropolysiloxane, based on the total weight of the latter and the paraffin wax.

2. The method for making a coated glass base having a low electrical conductivity under high humidity conditions, which process comprises coating the aforesaid glass base with a paraffin wax having incorporated therein from 0.05 to 10 per cent, by weight, of a polymethylchloropolysiloxane, based on the total weight of the latter and the paraffin wax.

KENNETH N. MATHES.
THOMAS J. RASMUSSEN.

References Cited in the file of this patent

UNITED STATES PATENTS

| Number | Name | Date |
|---|---|---|
| 2,272,588 | Simison | Feb. 10, 1942 |
| 2,333,535 | Lauer | Nov. 2, 1943 |
| 2,383,521 | Sowa | Aug. 28, 1945 |
| 2,407,037 | Sowa | Sept. 3, 1946 |
| 2,421,653 | Sauer | June 3, 1947 |
| 2,503,919 | Patnode | Apr. 11, 1950 |
| 2,527,793 | Bump | Oct. 31, 1950 |
| 2,547,396 | Joanen | Apr. 3, 1951 |
| 2,550,438 | Zoeller | Apr. 24, 1951 |